(12) United States Patent
Quaeck

(10) Patent No.: US 6,942,089 B2
(45) Date of Patent: Sep. 13, 2005

(54) SEALLESS RECIPROCATING SLAT CONVEYOR HAVING VERTICALLY INSTALLABLE COMPONENTS

(75) Inventor: Manfred W. Quaeck, Redmond, WA (US)

(73) Assignee: Keith Investments, LLC, Madras, OR (US)

( * ) Notice: Subject to any disclaimer, the term of this patent is extended or adjusted under 35 U.S.C. 154(b) by 9 days.

(21) Appl. No.: 10/449,976

(22) Filed: May 29, 2003

(65) Prior Publication Data

US 2004/0069599 A1 Apr. 15, 2004

Related U.S. Application Data

(60) Provisional application No. 60/384,223, filed on May 29, 2002.

(51) Int. Cl.[7] ................................................ B65G 25/04
(52) U.S. Cl. ............................... 198/750.1; 198/750.2; 198/750.4
(58) Field of Search ........................... 198/750.1, 750.2, 198/750.3, 750.4

(56) References Cited

U.S. PATENT DOCUMENTS

| | | | | |
|---|---|---|---|---|
| 4,785,929 A | * | 11/1988 | Foster | 198/750.4 |
| 4,858,748 A | * | 8/1989 | Foster | 198/750.4 |
| 4,907,691 A | * | 3/1990 | Foster | 198/750.2 |
| RE33,196 E | * | 4/1990 | Foster | 198/750.4 |
| 5,996,772 A | * | 12/1999 | Foster | 198/750.3 |
| 6,019,215 A | * | 2/2000 | Foster | 198/750.3 |
| 6,257,396 B1 | * | 7/2001 | Quaeck | 198/750.3 |
| 6,739,447 B2 | * | 5/2004 | Verhaeghe | 198/750.1 |

* cited by examiner

*Primary Examiner*—Gene O. Crawford
(74) *Attorney, Agent, or Firm*—Delbert J. Barnard

(57) ABSTRACT

The load supporting and moving surface of the conveyor is made up of longitudinal members called slats. The slats are edge to edge with small gaps between the edges. The slats are supported on bearing parts and bearing strips which are supported on longitudinal beams which are evenly spaced and extending lengthwise of the cargo space of the conveyance in which the conveyor is installed. The longitudinal beams are supported by and fastened to the cross beams of the conveyance. The longitudinal beams, bearing strips, bearing parts and slats of the conveyor are all installable from directly above the cross beams. The slats are held in place vertically by interlocking with the bearing parts. There is a juncture formed at every contact between a longitudinal beam and a cross beam. Bearing parts are installed a 10% to 50% of the junctures. The conveyor also comprises means to reciprocate the slats a stroke length. The longitudinal length of each bearing part is between 0.5 and 0.95 of the stroke length.

6 Claims, 4 Drawing Sheets

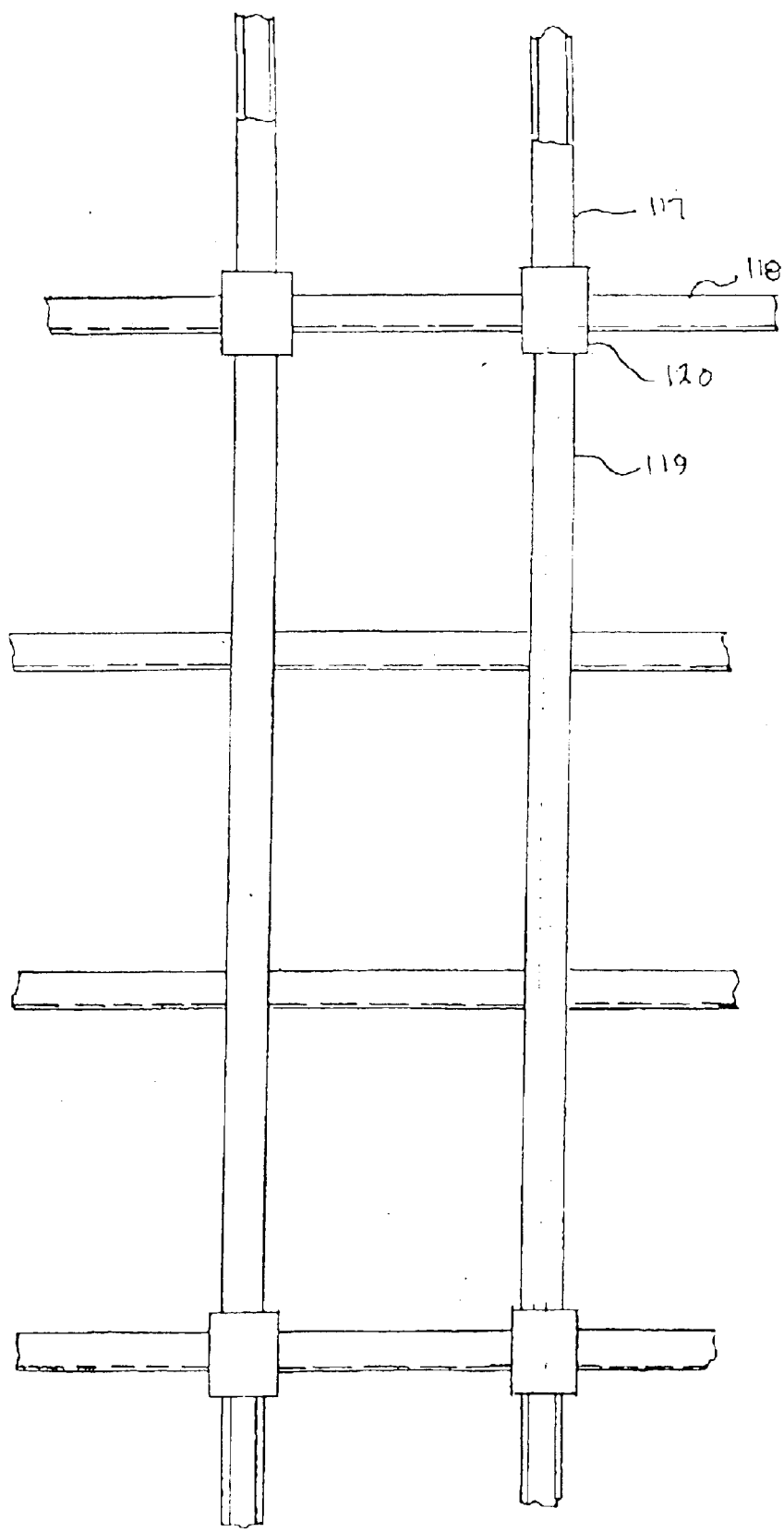

US 6,942,089 B2

SEALLESS RECIPROCATING SLAT CONVEYOR HAVING VERTICALLY INSTALLABLE COMPONENTS

RELATED APPLICATION

This application claims benefit of the filing date of Provisional Application No. 60/384,223, filed May 29, 2002, and entitled Sealless Reciprocating Slat Conveyor Having Vertically Installable Components.

TECHNICAL FIELD

The subject invention is in the field of conveyors, particularly conveyors for moving particulate matter, and usable in conveyances such as trucks and trailers.

BACKGROUND OF THE INVENTION

In common installations of reciprocating slat conveyors the truck or trailer comprises two parallel chassis beams on which are supported a plurality of cross beams, perpendicular to the chassis beams and spaced evenly along them. The conveyor mechanism itself is mounted on the cross beams and comprises a plurality of longitudinal beams, parallel to the two chassis beams, a plurality of bearing strips installed on the longitudinal beams and a plurality of slats which extend longitudinally and are slidably carded on the bearing strips. The slats are divided into groups of equal numbers, usually three groups. In basic operation, when all groups are moved in one direction the cargo moves with them. When the groups are moved in the opposite direction one at a time, the cargo does not move.

There are common, chronic problems with reciprocating slat conveyors as briefly described above. One problem is that particulate matter infiltrates the mechanism during the jolting and jostling when the conveyance is under way and also while the conveyor is operating. A second and somewhat related problem is that when the vehicle carrying the conveyor is underway and not loaded, the slats rattle against their supports and each other and suffer wear and cause unwelcome noise. The infiltration can accumulate and "freeze" the mechanism, rendering it inoperative and difficult to repair.

Several techniques are or have been used in efforts to alleviate or solve these problems. One example is disclosed in U.S. Pat. No. 4,144,963, issued to Olaf A. Hallstrom in 1979. In Hallstrom, conveyor the slats are mechanically firmly limited in vertical displacement relative to their supports and there are seals running longitudinally between the slats. This arrangement was found to be unsatisfactory and concepts not using seals, as such, were conceived, patented and used. U.S. Pat. No. 5,560,472, issued to Richard T. Gist in 1996 discloses a conveyor which is characterized as sealless and in which there are portions of the slats which are called seal beads. The seal beads contact the bearing strips and carry the weight of the slats and cargo supported by the slats, functioning as bearings and sealing incidentally. There were enough problems with the Gist concept to warrant further development, some of which is disclosed in U.S. Pat. No. 5,850,905, issued in 1998 to Raymond Keith Foster. Foster had acquired the rights to the Gist '472 patent and features resembling some of Gist features are incorporated in some of the variety of embodiments disclosed in the Foster '905 patent. There are features in Foster's '905 patent which are particularly important prior art to the subject patent. In most of the embodiments the seat beads of the slats are free to move away from the bearing strips up to one eighth inch. The purpose of this is stated to be to allow particulate matter trapped on the bearing strips to fall between the seal beads and the bearing strips to the ground below. However, an embodiment shown in FIG. 8 of the Foster '905 patent has bearing strips configured so that the seal beads are "urged into bearing seal contact with the bearing surfaces". This feature provides longitudinal cavities into which particles can travel and be trapped. This type of bearing strip is numbered 80" in FIG. 8 of the Foster '905 patent. In other embodiments disclosed in the Foster '905 patent, the bearing strips 80, 80' and 98 have edges which extend laterally on each of their sides beyond the edges of the bearing strips and are notched along their edges to provide more space for particulate matter which escapes through the bearing seal contacts to fall to the ground. These bearing strips extend the full length of the conveyor and the notches are machined since they cannot be extruded or economically molded. There is no written or pictorial evidence in the Foster disclosure that the bearing strips in the embodiment shown in FIG. 8 have notches in the edges of the bearing strips anywhere long their lengths.

A universal feature of many of the prior art reciprocating conveyors, is that the bearing strips and slats must be installed longitudinally. This is known to be a cumbersome and often difficult procedure, and space consuming, especially considering the 40 to 50 foot length beds of some trucks and trailers. It is well known that there is voluminous prior art in the field of the subject invention and that cited is considered to be the most pertinent currently known. In view of the above discussion the primary objective of the subject invention is to provide a sealless reciprocating slat conveyor which has minimum chance of becoming jammed and incapacitated by unwanted accumulations of particulate matter. A second objective is that the slats and bearing components be installable vertically, i.e. from above the slat and bearing support structure.

The following additional United States patents should be considered when putting the present invention into proper perspective relative to the prior art:

U.S. Pat. No. 4,679,686, issued Jul. 14, 1987 to Raymond Keith Foster; U.S. Pat. No. 4,858,748, issued Aug. 22, 1989 to Raymond Keith Foster; U.S. Pat. No. 5,044,870, issued Sep. 3, 1991 to Raymond Keith Foster; U.S. Pat. No. 5,096,356, issued Mar. 17, 1992 to Raymond Keith Foster; U.S. Pat. No. 5,238,360 issued Aug. 24, 1993 to Raymond Keith Foster; U.S. Pat. No. 5,355,996, issued Oct. 19, 1994 to Raymond Keith Foster; U.S. Pat. No. 5,415,271, issued May 16, 1995 to Raymond Keith Foster; U.S. Pat. No. 5,419,426, issued May 30, 1995, to Raymond Keith Foster; U.S. Pat. No. 5,433,312, issued Jul. 18, 1995 to Raymond Keith Foster; U.S. Pat. No. 5,547,067, issued Aug. 20, 1996 to Raymond Keith Foster; U.S. Pat. No. 5,560,472, issued Oct. 1, 1996 to Raymond Keith Foster; U.S. Pat. No. 5,605,221, issued Feb. 25, 1997 to Raymond Keith Foster; U.S. Pat. No. 5,806,660, issued Sep. 15, 1998 to Raymond Keith Foster; U.S. Pat. No. 5,850,905, issued Dec. 22, 1998 to Raymond Keith Foster; U.S. Pat. No. 5,860,507, issued Jan. 19, 1999 to Raymond Keith Foster; U.S. Pat. No. 5,996,772, issued Dec. 7, 1999 to Raymond Keith Foster; U.S. Pat. No. 6,013,585, issued Jan. 11, 2000 to Raymond Keith Foster and James Bradley Fete; and U.S. Pat. No. 6,019,215, issued Feb. 1, 2000 to Raymond Keith Foster.

Foster '748 discloses bearing members which are adapted to be snap-fitted onto longitudinal bearing support beams and conveyor slats that are adapted to be snap-fitted onto the bearings. Foster '360 discloses another bearing construction that is adapted to be snapped onto support beams for the bearings and conveyor slat members that are adapted to be snapped onto the bearings.

BRIEF SUMMARY OF THE INVENTION

The subject invention is a sealless reciprocating slat conveyor for use primarily in trucks and trailers used to transport particulate materials such as sawdust, fertilizer and grains. The construction details are basically currently conventional. A typical vehicle structure on which the conveyor is installed comprises two vehicle longitudinal beams and a plurality of cross members. The cross members are attached to the top of the beams, perpendicular to them and evenly spaced-along the length of the beams. Alternate construction does not use longitudinal beams but the cross members are similarly supported and spaced. The basic components of the conveyor are longitudinal beams, slats, bearing parts, bearing strips and means to activate the slats. The longitudinal beams are attached to the cross members parallel to the vehicle centerline evenly spaced laterally. The bearing parts and bearing strips are installed on the longitudinal beams and the slats are installed on the bearing parts and bearing strips. In the subject installation the bearing parts are installed at junctures of longitudinal beams and cross members but not at every juncture. In a typical installation the parts are installed at every fourth juncture on each beam and not necessarily in lateral alignment beam to beam. The bearing strips are installed by being snapped into place vertically between beating parts. The slats are then snapped vertically into place on the bearing parts and strips. The bearing parts also engage the cross members to prevent longitudinal displacement of the bearing parts and strips. The cross sectional shapes of the longitudinal beams are such that they enable snap-on engagement of both the bearing parts and strips. Each slat has two webs extending downward and configured to slidably interconnect with the bearing parts. In some embodiments, the parts are dimensioned to allow limited vertical movement of the slats relative to the bearing parts and strips. In others the parts and slats are elastically urged together.

A most significant feature of the invention is that the longitudinal dimension of the bearing part is a fraction of the length of the oscillation strokes of the slats. This means that all of the area of the slats contacting the bearing parts is free of contact with the bearing part at some time in each oscillation. The importance of this feature lies in the fact that there is a strong tendency for particles lodged between the slat and a bearing part to be carried out of the contact between the slat and bearing part and dropped free of the mechanism. The invention is described in detail below with reference to the attached drawings.

BRIEF DESCRIPTION OF THE SEVERAL VIEWS OF THE DRAWING

Like reference numerals designate like parts throughout the several views of the drawings, and:

FIG. 9 is a schematic upper elevation view of a portion of the subject conveyor, showing one example of the general disposition of cross members, longitudinal members and bearing parts.

DETAILED DESCRIPTION OF THE PREFERRED EMBODIMENTS

Figure 1:
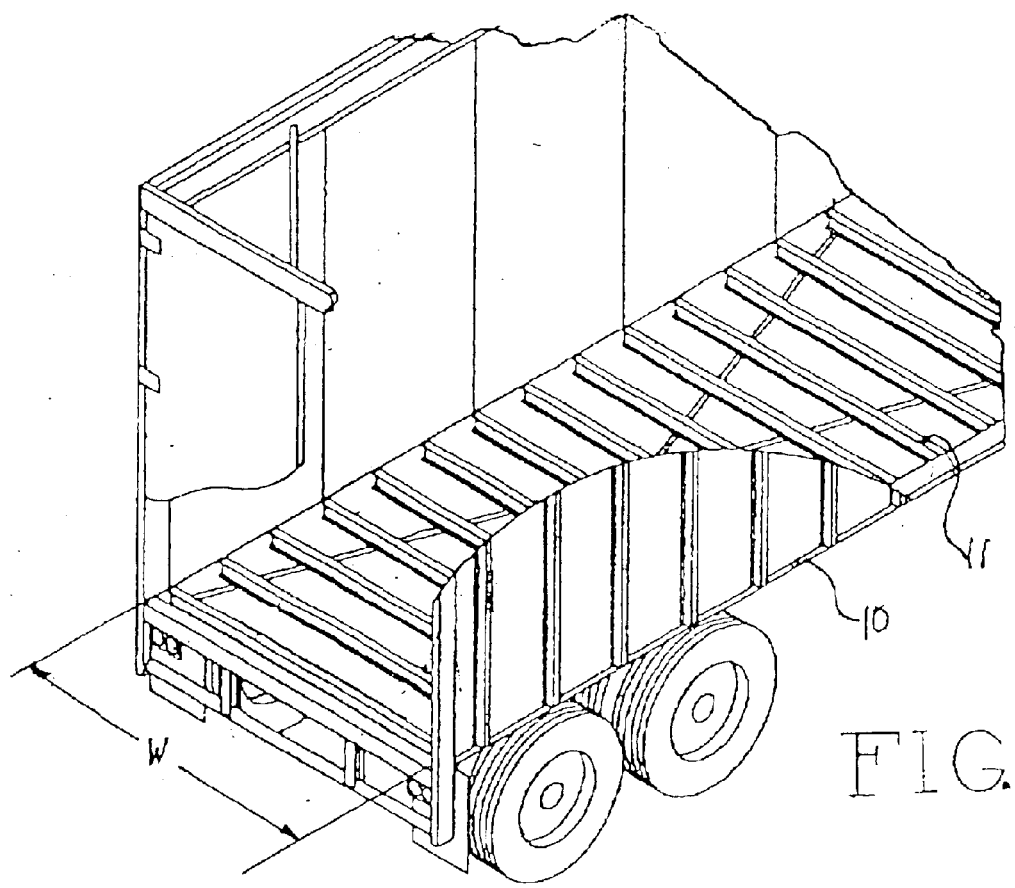
FIG. 1 illustrates a portion of a trailer ready for installation of a reciprocating slat conveyor.

The subject invention is a sealless reciprocating slat conveyor having vertically installable components. Such conveyors are usually installed on the beds of conveyances such as trucks and trailers. FIG. 1 illustrates a portion of a trailer 10 ready for installation of a reciprocating slat conveyor. The conveyor is installed on the cross beams of the vehicle, beam 11 being typical. As shown, the cross beams are perpendicular to the longitudinal centerline of the conveyance and are evenly spaced.

The basic components of the conveyor are longitudinal beams, bearing pads, bearing strips and slats, all shown in detail below. The longitudinal beams are installed on the cross beams, parallel to the centerline of the conveyance and evenly spaced across the interior width W of the conveyance. This creates a plurality of junctures between cross beams and longitudinal beams.

Figure 2:
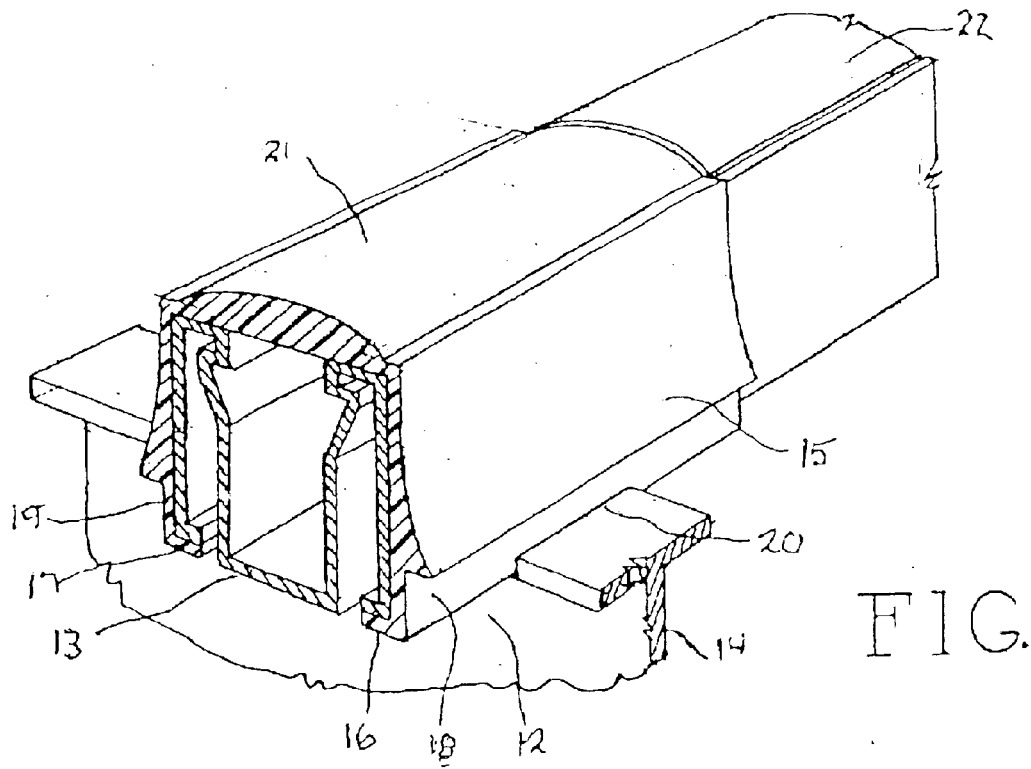
FIG. 2 illustrates a portion of the conveyor showing one of the junctures of a first embodiment of a longitudinal beam and a cross member with a bearing part installed.

FIG. 2 illustrates a portion of the conveyor showing one of the junctures 12 of longitudinal beam 13 and cross beam 14. At a plurality of junctures along their lengths the longitudinal beams are attached to cross beams by cap screws as shown below, preferably self threading cap screws. Also shown in FIG. 2 is a bearing part 15. Part 15 has flanges 16 and 17 at the lower edges of sides 18 and 19. These flanges hold the bearing part in place. The part is flexible enough to allow the sides to bend enough for the part to be vertically installed. Each flange is notched, notch 20 being visible in this view, midway along their length and the notches engage the cross beam 14 so that the part is locked against longitudinal motion on the longitudinal beam. The part has, in this embodiment, a convex bearing surface 21. The bearing parts are not installed at every juncture between a longitudinal beam and a cross beam but are installed at every fourth, fifth or sixth juncture, for example, along the lengths of the longitudinal beams. Bearing surfaces lengthwise between bearing parts are provided by beating strips installed on the longitudinal beam, adjoining bearing parts, bearing strip 22 being shown in FIG. 2, Cross sectional shape of the bearing strip used in this embodiment of the conveyor is shown in FIG. 4 below.

Figure 3:
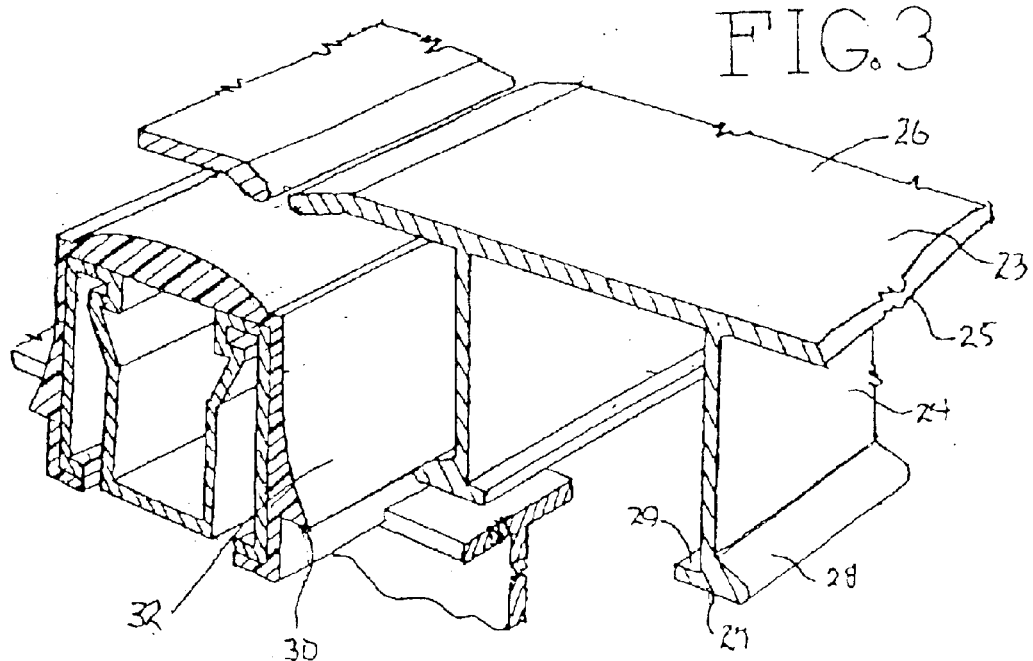
FIG. 3 illustrates one embodiment of a slat installed on the bearing part and bearing strip portion shown in FIG. 2.

FIG. 3 illustrates a portion of one embodiment of slat installed on the bearing part and bearing strip portion shown in FIG. 2. All the slats are identical in cross section in a particular embodiment and slat 23 is typical. Each slat has two parallel webs, web 24 being typical, extending from the underside 25 of working surface 26 at the lower edges of the webs, edge 27 being typical, there is a cam extending toward the center of the slat and a ridge extending away from the center, cam 28 and ridge 29 being typical. The cams engage shoulders on the sides of the bearing parts, shoulder 30 being typical. The webs, cam and shoulder dimensions can be such that the cam action tends to urge the slat against the bearing surfaces or they can be dimensioned to allow some vertical freedom of motion between the slats and bearing surfaces. Curved areas, area 32 being typical, ease the vertical installation of the slats, the slats being flexible enough to handle the deformation caused by the dams and web spreading apart to accommodate the assembly.

Figure 4:
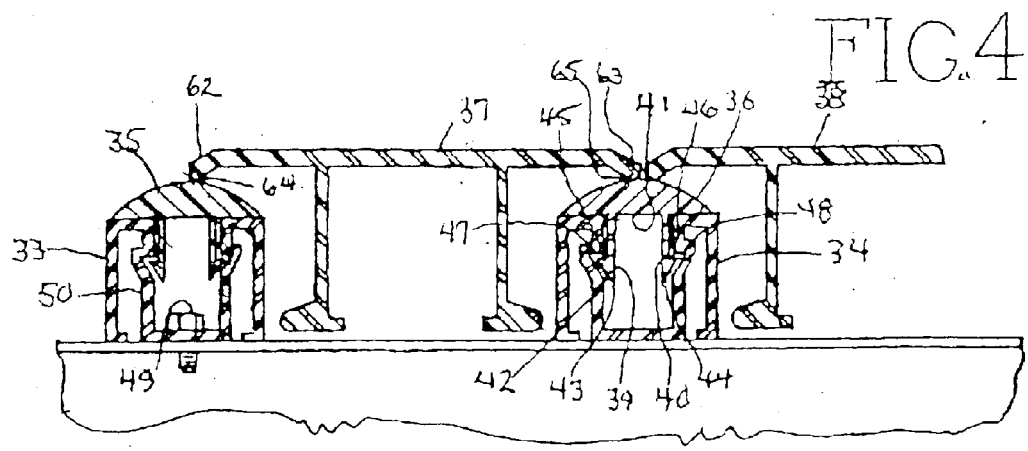
FIG. 4 is a section of two longitudinal beams as shown in FIG. 2 with a bearing strip installed on each and a slat and slat portion in place.

FIG. 4 is a section of two longitudinal beams 33 and 34 as shown in FIGS. 2 and 3 with bearing strips 35 and 36 installed in them, the strips supporting slats 37 and 38 (partially shown). Each strip has two webs, webs 39 and 40 being typical, extending downward from its flat lower surface 41. There is a triangular wedge, wedge 42 being typical, at the lower edges 43 and 44 of the webs. The wedges form upward facing shoulders 45 and 46 which engage shoulders 47 and 48 in the longitudinal beam to retain the strip vertically. Fastener 49 is an example of the fasteners which connect the longitudinal beams, beam 50 in this view.

Figure 5:
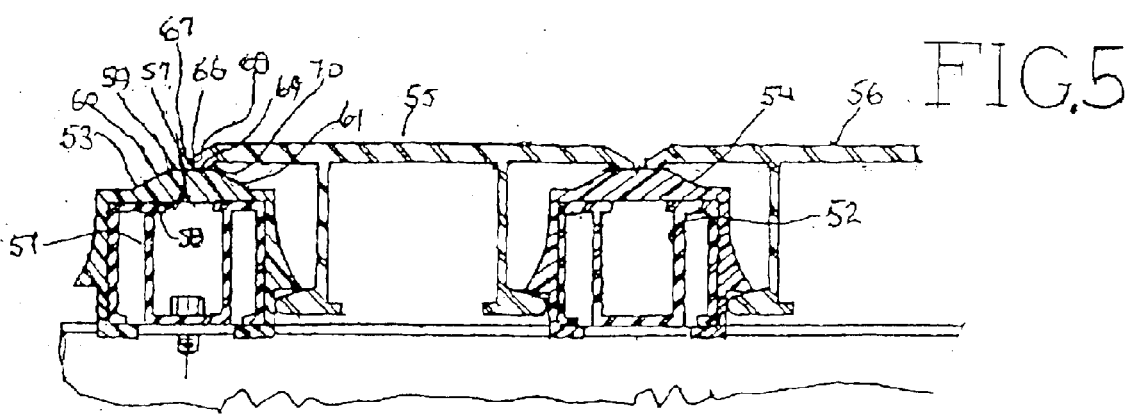
FIG. 5 is a section of a second embodiment of longitudinal beam and bearing part showing two beams and parts with a slat and part of a slat in place.

FIG. 5 is a section of a second embodiment of longitudinal beam and a second embodiment of bearing parts showing two beams 51 and 52 and parts 53 and 54 supporting a slat 55 and part of another slat 56. The important difference between this beam embodiment and this bearing part embodiment are details of configuration of the beam and part. In the beam, beam 51 being typical, there is no shoulder 47 or 48, the shoulder being replaced by ridge 57 with lower surface 58. The upper surfaces of the bearing parts, part 53 being typical, have a raised, flat mid portion 59 and downward sloping portions 60 and 61. The sla'cs bear on the mid portion. FIG. 5 also shows a different slat embodiment than that shown in FIGS. 3 and 4. The edges, edges 62 and 63 in FIG. 4 being typical, slope downward and are rounded at their ends 64 and 65. In FIG. 5 the edges, edge 66 being typical, has vertical side 67, chamfer 68, bearing surface 69 and a chamfer 70.

Figure 6:
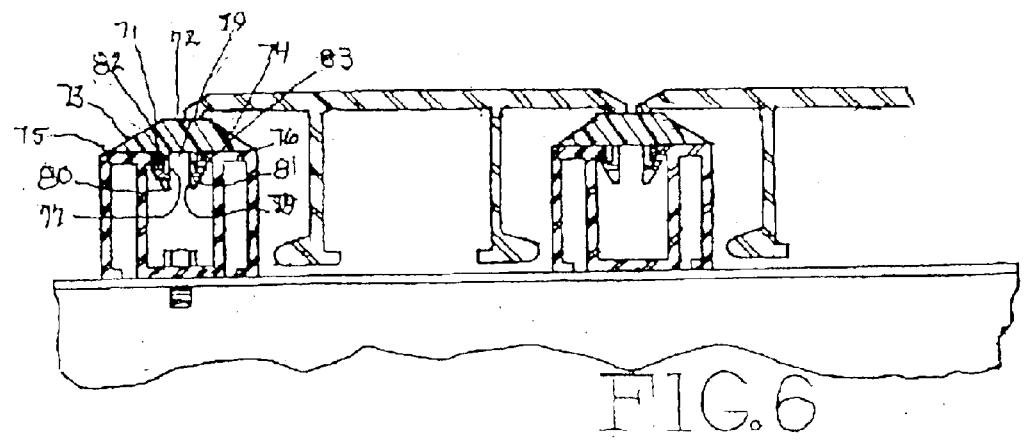
FIG. 6 is a section showing longitudinal beams as shown in FIG. 5 fitted with a second embodiment of bearing strip.

FIG. 6 is a section showing longitudinal beams as shown in FIG. 5, fitted with a second embodiment of bearing strip, strip 71 being typical. It has a flat top mid section 72 and sides 73 and 74 sloping to its edges 75 and 76. It has two webs 77 and 78 extending from its underside 79. The lower edges 80 and 81 of the webs are triangular and provide upward facing shoulders 82 and 83. When the strip is pressed downward into the longitudinal beam shown in this FIG. and FIG. 5, the webs deflect, allowing shoulders 82 and 83 to engage lower surfaces, surface 58 as numbered in FIG. 5 being typical, and retain the strip.

Figure 7:
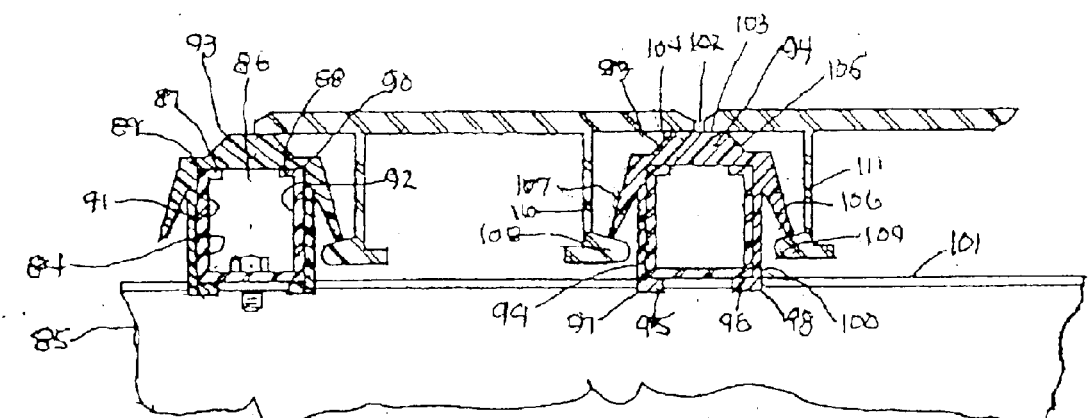
FIG. 7 is a section showing a third embodiment of longitudinal beam and another embodiment of bearing part with a slat and part of a slat in place.

FIG. 7 is a section showing a third embodiment of longitudinal beam and another embodiment of bearing part with a slat and part of a slat in place. The longitudinal beam 84 is a rectangular channel installed on a cross beam 85 with its opening 86 facing upward. There are ddges 87 and 88 facing inward at the upward edges 89 and 90 of the channel sides 91 and 92. Bearing part 93 is typical of this embodiment of bearing part. It is, as shown, an inverted channel 94 having ddges 95 and 96 extending toward each other at ends 97 and 98 of sides 99 and 100. These ridges engage the beam as described for the bearing part in FIG. 2, the cross beam 101. This type of engagement is typical for all the bearing part embodiments disclosed in this application. The closed, end 102 of the channel has a centered raised portion 103 having sloping sides 104 and 105. Tapered flaps 106 and 107, directed downwardly and outwardly from end 102 engage cams 108 and 109 of webs 110 and 111 respectively and help retain the slats vertically.

Figure 8:
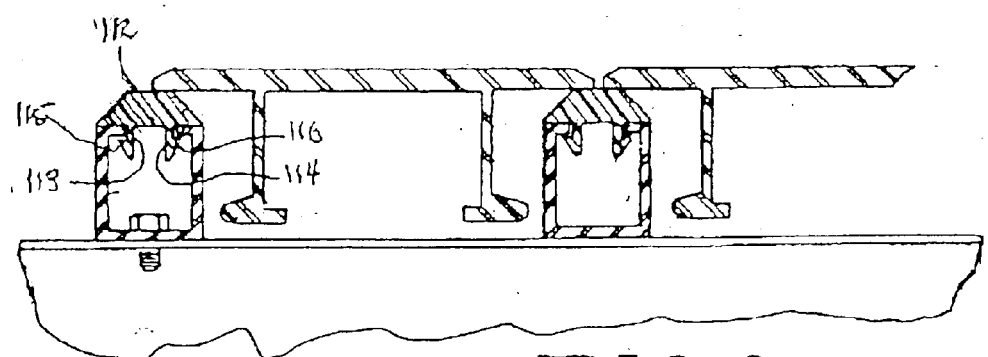
FIG. 8 is a section showing the longitudinal beams shown in FIG. 7 fitted with another embodiment of bearing strip installed and a slat and part of a slat in place.

FIG. 8 is a section showing the longitudinal beams shown in FIG. 7 fitted with another embodiment of bearing strip and a slat and part of a slat in place. This bearing strip 112 is similar to the strip 71 shown in FIG. 6. The webs 1.13 and 114 and shoulders 115 and 116 are repositioned to engage ridges 87 and 88 as numbered in FIG. 6.

FIG. 9 is a schematic upper elevation view of a portion 117 of the subject conveyor showing one example of the general disposition of cross members, member 118 being typical, longitudinal beams, beam "119 being typical and bearing parts, part 120 being typical. In the conveyor the contacts between longitudinal beams and cross beams create a total number of junctures. The number of bearing parts is a fraction of the total number of junctures, the fraction being in a range of 1/10 to 1/2.

It is important to note that there is a significant feature of the subject invention, applicable to all the embodiments disclosed herein, in reciprocating slat conveyors the slats are moved longitudinally a distance called a stroke length. In the subject invention the longitudinal dimension of the bearing parts is less than the stroke length. The significance of this feature is that 100% of the surface area of the slats is free of the confinement of the bearing parts at some time during each reciprocation. This freedom provides optimum chances for particles to fall free of the slats. Further, there is a wiping action of the bearing parts on the slats during reentry of slats into bearing parts that strongly tends to remove leaked particles, thus minimizing chances of jamming of the conveyor by accumulated particulate matter.

It is believed to be understandable from this description that the subject invention meets its objectives. It provides a sealless reciprocating slat conveyor which has minimum chances of becoming jammed and incapacitated by accumulation of particulate matter the slats and their support structure. Also, the slats and bearing components can be installed from above the slat and bearing support structure.

It is also considered to be understood that while certain embodiments of the subject invention are disclosed herein, other embodiments and modifications of those disclosed are possible within the scope of the invention is limited only by the attached claims.

What is claimed is:
1. A reciprocating slat conveyor, comprising:
   a plurality of longitudinally spaced apart transverse frame members;
   a plurality of laterally spaced apart longitudinal bearing support beams supported on and connected to the transverse frame members;
   a plurality of bearing members on said longitudinal bearing support beams where at least some of the bearing support beams are supported on and are connected to the transverse frame members, said bearing members each having a top that is on its longitudinal bearing support beam, sidewalls depending from the top on each side of the longitudinal support beam, notches in said sidewalls which receive portions of the transverse frame members, and lock flanges extending inwardly from the sidewalls of the bearing members into the positions below the longitudinal bearing support beams, whereby the lock flanges hold the bearing members on the bearing support beams and the positioning of the transverse frame members in the notches prevents the bearing members from moving longitudinally along the bearing support beams;
   bearing strips on the bearing support beams between the bearing members, said bearing strips having tops at substantially the same level as the tops on the bearing members, wherein the tops of the bearing members and the tops on the bearing strips form a substantially continuous bearing surface lengthwise of the support beams; and two elongated conveyor slats for each bearing support beam, said conveyor slats having sidewalls and tops with side portions laterally outwardly from the sidewalls and that sit down on the tops of the bearing members and the tops of the bearing strips.

2. The reciprocating slat conveyor of claim 1 wherein the side portions of the tops of the conveyor slats have downwardly extending edges that contact and no underlining slide on the tops of the bearing members and the tops of the bearing strips.

3. The reciprocating slat conveyor of claim 1, wherein the bearing members have downwardly and outwardly extending outer side portions, each terminating in a shoulder, and the floor slats have sidewalls with lower portions and flanges that project laterally inwardly from the lower portions, said bottom flange defining a lateral space between them, whereby the slats can be pushed down on the bearing members and the bottom flanges will slide down the sides of the bearing members and move into a position below the shoulders, and whereby in response to an upward movement of a slat, the shoulders on the bearing members will contact the flanges on the slats and prevent the slats from moving up off of the bearing members.

4. The reciprocating slat conveyor of claim 3, wherein the bearing strips have sidewalls that are spaced apart a distance that is substantially equal to or slightly smaller than the lateral space between the bottom flanges of the conveyor slats.

5. The reciprocating slat conveyor of claim 1, wherein the tops of the conveyor slats are of a predetermined width and vertical walls project downwardly from the tops and include outwardly projecting lower flange portions, and said bearing members include side portions which widen as they extend downwardly and have lower edge that is positioned to be above a flange on each side of the conveyor slat, so that an upward force of the conveyor slat will cause the flanges to contact the lower edges of the side member, and such contact will prevent upward movement of the conveyor slat up off from the bearing members.

6. The reciprocating slat conveyor of claim 5, wherein the sides of the bearing members are laterally springable inwardly, so that the conveyor slats can be positioned with the flanges on a confronting side of a bearing member and a downward movement of the conveyor slat will cause the flanges to slide downwardly along the sides of the bearing members until the flanges are positioned below a lower edge on a side of a bearing member.

\* \* \* \* \*